United States Patent
Southgate et al.

(10) Patent No.: US 11,409,554 B2
(45) Date of Patent: Aug. 9, 2022

(54) TIME DILATION BASED ON AN AMOUNT OF RESOURCES ALLOCATED TO A SOFTWARE EXECUTION ENVIRONMENT

(71) Applicant: Hewlett-Packard Development Company, L.P., Spring, TX (US)

(72) Inventors: Andrew Southgate, Cambridge (GB); Adrian Taylor, Cambridge (GB); Ian Pratt, Cambridge (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 173 days.

(21) Appl. No.: 16/696,020

(22) Filed: Nov. 26, 2019

(65) Prior Publication Data

US 2020/0097317 A1    Mar. 26, 2020

Related U.S. Application Data

(62) Division of application No. 15/268,191, filed on Sep. 16, 2016, now Pat. No. 10,503,534.

(60) Provisional application No. 62/385,820, filed on Sep. 9, 2016.

(51) Int. Cl.
*G06F 9/455* (2018.01)
*G06F 9/50* (2006.01)
*G06F 9/48* (2006.01)

(52) U.S. Cl.
CPC ........ *G06F 9/45558* (2013.01); *G06F 9/4887* (2013.01); *G06F 9/5038* (2013.01); *G06F 9/5055* (2013.01); *G06F 2009/4557* (2013.01); *G06F 2209/501* (2013.01); *G06F 2209/506* (2013.01)

(58) Field of Classification Search
None
See application file for complete search history.

(56) References Cited

U.S. PATENT DOCUMENTS

| | | | |
|---|---|---|---|
| 7,058,838 B2 | 6/2006 | Xu et al. | |
| 7,475,002 B1 | 1/2009 | Mann et al. | |
| 7,941,688 B2 | 6/2011 | Sharma et al. | |
| 8,086,890 B2 | 12/2011 | Song et al. | |
| 8,539,010 B2 * | 9/2013 | Inakoshi | G06J 1/00 708/1 |
| 8,752,047 B2 | 6/2014 | Banga et al. | |
| 9,459,652 B1 | 10/2016 | Landers et al. | |

(Continued)

OTHER PUBLICATIONS

Wu et al; Taming Hosted Hypervisors with (Mostly) Deprivileged Execution, NDSS Symposium 2013; Apr. 23, 2013 (Year: 2013).

*Primary Examiner* — Bing Zhao
(74) *Attorney, Agent, or Firm* — HPI Patent Department

(57) ABSTRACT

Approaches for managing how the passage of time is observed by a software execution environment, such as a virtual machine or a sandbox environment. A computer system maintains a set of physical time sources. A set of virtual time sources are computed based on the set of physical time sources. The virtual time sources operate independently of the set of physical time sources. For example, the virtual time sources may observe time passing faster or slower than the set of physical time sources. The set of virtual time sources are presented to the software execution environment as the set of time sources. Many benefits may be obtained such as higher utilization of allocated resources and avoidance of timeouts.

15 Claims, 3 Drawing Sheets

(56) References Cited

U.S. PATENT DOCUMENTS

| | | |
|---|---|---|
| 10,054,977 B2 | 8/2018 | Mikhaylov et al. |
| 10,054,978 B2 * | 8/2018 | Mikhaylov ............... G06F 1/12 |
| 10,706,149 B1 | 7/2020 | Vincent |
| 10,817,606 B1 * | 10/2020 | Vincent ............... G06F 9/45558 |
| 2011/0047315 A1 | 2/2011 | DeDinechin et al. |
| 2012/0159138 A1 * | 6/2012 | Tsirkin .................. G06F 9/4401 |
| | | 713/2 |
| 2014/0053272 A1 | 2/2014 | Lukacs et al. |

* cited by examiner

TIME DILATION BASED ON AN AMOUNT OF RESOURCES ALLOCATED TO A SOFTWARE EXECUTION ENVIRONMENT

CLAIM OF PRIORITY

This application is a U.S. divisional patent application of U.S. non-provisional patent application Ser. No. 15/268,191, filed Sep. 16, 2016, which claims priority to U.S. provisional patent application No. 62/385,820, filed Sep. 9, 2016, both entitled "Adaptive Clock Scaling To Optimize Time-Based Operations Within Virtualized Guest Operating Systems," the disclosures of which are hereby incorporated by reference in its entirety for all purposes as if fully set forth herein.

FIELD OF THE INVENTION

Embodiments of the invention relate to providing an observable clock to a virtual machine.

BACKGROUND

A computer system may execute one or more virtual machines. A virtual machine is a self-contained software environment that behaves as if it were a separate computer. Each virtual machine may execute its own operating system, typically referred to as a guest operating system. The first operating system loaded by a computer system, which executes on the native hardware of the computer system, is referred to as a host operating system.

Guest operating systems may measure the passage of time using several different approaches, such as tick counting and tickless timekeeping. In tick counting, the guest operating system instructs the computer system to periodically interrupt the guest operating system at a known rate, such as 100 times per second. The guest operating system handles such interrupts, called ticks, and maintains a count of those ticks to ascertain how much time has passed.

According to tickless timekeeping, the computer system maintains a count of the number of time units that have passed since the computer system booted, and the guest operating system simply reads the counter and computes how much time has passed when necessary. Tickless timekeeping has several advantages. In particular, it does not burden the CPU with interrupt handling and can measure time at a finer granularity. However, tickless timekeeping is practical only on computer systems that possesses a suitable hardware counter. The counter must run at a constant rate, be reasonably fast to read, and not often overflow.

Operating systems also keep mark the passage of absolute time or "wall-clock time." To do so, when an operating system initially boots, the operating system may read wall-clock maintained by the hardware. The hardware may comprise a battery to power the wall-clock when the hardware is not powered on. Alternately, the wall-clock time may be obtained by the operating system from a server located over a network. To correct for long-term drift and other errors in time measurement, the operating system might periodically check its wall-clock against a network time server and make adjustments as needed.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1B:
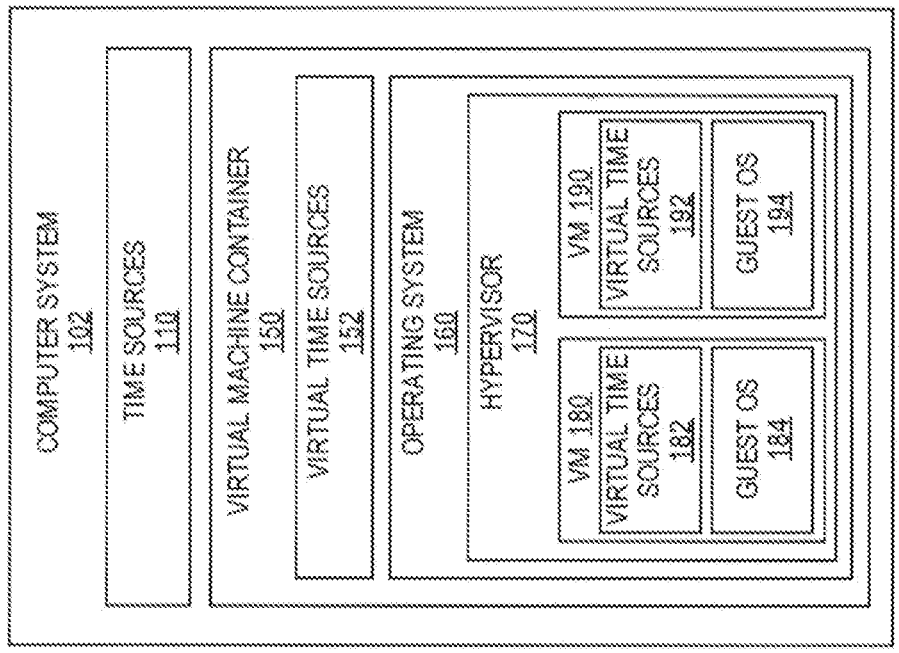
FIG. 1B is a block diagram illustrating a system for managing the passage of time observed by a virtual machine comprising a Type 2 hypervisor according to an embodiment of the invention.

Approaches for managing how the passage of time is observed by software execution environments are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

A software execution environment, such as a sandbox or virtual machine, operates by time-sharing the physical hardware upon which it executes. As a result, software execution environments cannot exactly duplicate the timing activities of physical machines. An operating systems executing in a software execution environment may be exposed to a number of sources of timekeeping. Prior art approaches have generally attempted to ensure that the sources of time observable by software execution environments are the same as those kept by the physical hardware as best possible.

Embodiments of the invention provide for managing how the passage of time is observed by software execution environments to achieve beneficial results. The time sources presented to software execution environments of an embodiment are virtualized and controlled independently of the set of time sources maintained by the physical hardware. While various embodiments shall chiefly be described in terms of a manipulating how a virtual machine observes time, embodiments of the invention may be employed with any type of software execution environment and are not limited to use with virtual machines.

It is observed that during background virtualization operations, such as P2V operation (which involving decoupling and migrating software and data from a non-virtual environment into a virtual environment, such as a virtual machine) and template virtual machine preparation (wherein the template may be used to instantiate one or more virtual machines having characteristics described by the template), having the passage of time within a virtual machine so tightly coupled to the passage of time observed by the physical hardware is not necessarily optimum for the task.

For example, the CPU and I/O resources allocated to a guest operating system can be significantly lower than that of the host operating system. This condition may lead to the inappropriate triggering of timeouts in the guest operating system as events proceed too slowly in the guest operating system compared to the rate in which events transpire in the host operating system. Virtual machines executing in the background with a low priority are particularly susceptible to this problem. As another example, wait or sleep operations can be inappropriately long for certain software execution environments, which may lead to CPU resources or I/O capacity going unused when those resources could otherwise been utilized. This is particularly true for certain background operations and in preparing a virtual machine template.

The passage of time is also relevant in the detection of malware. Malware may contain a programmed time delay before its hostile actions are triggered. This delay may be intended to defeat detection systems that allow potential malware to execute in a contained or sandbox environment in the hope of detecting suspicious activity so that the malware may be identified and subsequently quarantined. To combat any delay programmed into the malware, malware detection systems may wait for some time before rendering a judgement upon whether a file contains malware, which occupies resources and delay traffic in the interim.

The examples discussed above involve timeout and wait operations which are, by their nature, designed to be performed within a secure environment, such as a software execution environment. It is not practical to directly adjust or manipulate such timeout values within guest operation systems. However, it is possible to manipulate how the guest operating systems observe time, and to that end, embodiments of the invention shall be discussed below for controlling how a software execution environment, such as a virtual machine, observes the passage of time to achieve beneficial results.

There are a variety of different ways in which a virtualized environment might be constructed. Embodiments may operate in a variety of different ways of facilitating virtualization. To provide two concrete examples, embodiments of the invention will be discussed with reference to a Type-1 hypervisor as well as a Type-2 hypervisor. Those skilled in the art shall appreciate that embodiments of the invention may be employed in other virtualized environments which do not employ components traditionally considered Type-1 or Type-2 hypervisors.

Figure 1A:
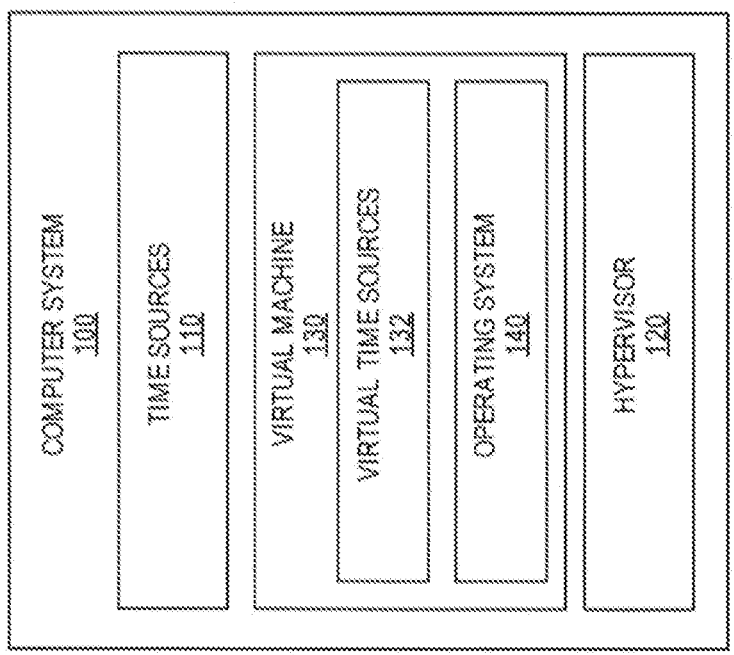
FIG. 1A is a block diagram illustrating a system for managing the passage of time observed by a virtual machine comprising a Type 1 hypervisor according to an embodiment of the invention.

FIG. 1A is a block diagram illustrating a system for managing how the passage of time is observed by virtual machine 130 according to an embodiment of the invention. FIG. 1A depicts computer system 100, which as broadly used herein, refers to any computer system comprising one or more processors and software which may be executed upon the one or more processors. An example of computer system 100 is described in further detail below with reference to FIG. 3.

Computer system 100 includes a set of physical time sources 110, which refer to one or more sources of time maintained by computer system 100. Thus, set of physical time sources 110 may include logical time sources (using approaches such as tick counting and tickless timekeeping for example) and wall-clock time (also referred to as absolute time). Set of physical time sources 110 may be observed by a host operating system executing on computer system 100.

As depicted in FIG. 1A, hypervisor 120 is a Type-1, or "bare metal" hypervisor that executes upon the hardware of computer system 100. Hypervisor 120 may instantiate one or more virtual machines, such as virtual machine 130. Guest operating system 140 may execute within virtual machine 130.

Embodiments of the invention expose a set of virtual time sources 132 to guest operating system 140. Set of virtual time sources 132 refer to one or more virtualized time sources that measure time at a rate independent of set of physical time sources 110. Thus, set of virtual time sources 132 may measure the passage of time faster or slower than set of physical time sources 110. In addition, set of virtual time sources 132 may be manipulated such that the passage of time as measured by set of virtual time sources 132 accelerates or decelerates relative to set of physical time sources 110. Note that operating system 140 would be unable to detect that set of virtual time sources 132 are operating independently from, and at a different rate than, set of physical time sources 110.

Embodiments of the invention may also be implemented using a Type-2 hypervisor, as shown in FIG. 1B, which is a block diagram illustrating a computer system 102, comprising a Type 2 hypervisor 170, for managing the passage of time observed by a virtual machine according to an embodiment of the invention. Thus, embodiments of the invention may be employed with any type of hypervisor and in a variety of different virtualization environments.

In FIG. 1B, computer system 102, which as broadly used herein, refers to any computer system comprising one or more processors and software which may be executed upon the one or more processors. An example of computer system 102 is described in further detail below with reference to FIG. 3. Set of physical time sources 110 depicted in FIG. 1B correspond to the same functional component as shown in FIG. 1A.

Embodiments of the invention may expose set of virtual time sources 152 to guest operating systems 184 and 194. Set of virtual time sources 152 operate similar to that of set of virtual times sources 132 but for their use within the embodiment of FIG. 1B. Thus, operating systems 184 and 194 are unable to detect that set of virtual time sources 152 are operating independently from, and at a different rate than, set of physical time sources 110.

Virtualization may be carried out in computer system 102 with the assistance of virtual machine container 150. As broadly used herein, virtual machine container 150 refers to refers to any container, abstraction, or mechanism which may be used to enforce and manage access to a bounded area of memory. For example, virtual machine container 150 may be implemented as a VMCS container provided by certain Intel® hardware by an embodiment. Virtual machine container 150 is designed or configured to have insufficient privilege to access any portion of the set of memory pages in which hypervisor 170, or any virtual machine instantiated thereby, reside. Therefore, processes executing within virtual machine container 150 cannot access resources assigned to or allocated by hypervisor 170, but for certain exceptions discussed below.

Embodiments may employ different mechanisms to ensure that virtual machine container 150 lacks sufficient privilege to access resources allocated to or by hypervisor 170. One way for doing so is by removing reference to the set of memory pages in which hypervisor 170 resides from the Extended Page Tables (EPT) of host operating system 160. Extended Page Tables are tables used by a Memory Management Unit (MMU) to map guest-physical addresses to host-physical addresses. Thus, in an embodiment, the Extended Page Tables of virtual machine container 150 allows host operating system 160 to access the memory and other resources host operating system 160 is supposed to possess, but not the memory and other resources belonging to or allocated by hypervisor 170. Hardware components, such as a MMU, may establish and enforce constraints on what portions of memory host operating system 160 is allowed to access based on data within the Extended Page Tables.

Embodiments may take different approaches for establishing host operating system 160 within virtual machine container 150. For example, in one embodiment, initially, host operating system boots. Thereafter, after booting host operating system 160, host operating system 160 is transferred into a virtual machine container 150. In a different approach, prior to booting host operating system 160, a portion of machine memory that host operating system 160 cannot access is reserved. This reserved area of memory may be a VMCS container in an embodiment. Thereafter, hypervisor 170 is instantiated within the reserved portion of memory which host operating system 160 cannot access.

In an embodiment, once host operating system 160 is prevented from accessing any resources belonging to or allocated by hypervisor 170, devices under the control of host operating system 160 are prevented from performing unauthorized direct memory accesses (DMA) to resources belonging to or allocated by hypervisor 170 by means of configuring the input/output memory management unit (IOMMU). However, that is not to say that host OS operating system 160, or devices under control of host operating system 160, can never access the resources belonging to or allocated by hypervisor 170. Indeed, in the natural course of operation, hypervisor 170 will rely upon host operating system 160 to perform certain activity, such as I/O operations, on behalf of hypervisor 170 or virtual machines instantiated by hypervisor 170, such as virtual machines 180 and 182.

To balance the need to have host operating system 160 perform I/O operations for hypervisor 170 while minimizing the scope of access afforded to host operating system 160, in embodiments of the invention, hypervisor 170 may provide host operating system 160 temporary access to those memory pages involved in the performance of an operation (such as an I/O operation). Thereafter, hypervisor 170 may revoke access to those memory pages from host operating system 160, presumably once the I/O operation has been performed. In this way, host operating system 160 only has access to those memory pages necessary to perform the operations it has been requested to perform by hypervisor 170 or virtual machines instantiated by hypervisor 170, such as virtual machines 180 and 182.

To illustrate a concrete example, hypervisor 170 or virtual machines 180 and 182 may provide host operating system 160 temporary access to a set of memory pages by granting a token to host operating system 160. Thus, when host operating system 160 performs an I/O operation it can present the token to the hypervisor 170 to facilitate the reading from or writing to the location of memory identified by the token as required by the requested operation.

Rather than providing a memory address to hypervisor 170 to identify a set of memory pages at which a requested operation is to be performed, host operating system 160 need only provide a token. When host operating system 160 wishes to read or write to a set of memory pages allocated to hypervisor 170, host operating system 160 notifies hypervisor 170 that host operating system 160 desires that a particular operation be performed against a set of memory pages and provides a token for those memory pages to hypervisor 170. If the token is valid, then hypervisor 170 will permit the read or write operation to the set of memory pages identified by the token. Hypervisor 170 will subsequently revoke the temporary permission to write to that location in memory from host operating system 160 by causing the token to become invalid. If the token is invalid, then hypervisor 170 will not permit the operation to be performed by host operating system 160.

If a guest operating system (such as guest operating system 184 or 194) uses a paravirtual device driver, then the paravirtual device driver will make an explicit request to hypervisor 170 to allow host operating system 160 access to a particular area of memory for purposes of performing 10 operations. Additional details of how virtualization may be implemented by the embodiment of FIG. 1B is described in U.S. patent application Ser. No. 14/741,147, entitled "Ensuring the Privacy and Integrity of a Hypervisor," filed on Jun. 16, 2015, and which is incorporated by reference for all purposes as if fully set forth herein.

Figure 2:
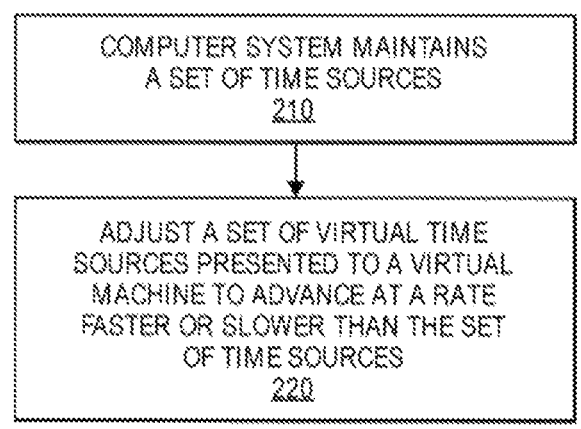
FIG. 2 is a flowchart illustrating the steps of managing the passage of time observed by a virtual machine according to one embodiment of the invention.

FIG. 2 is a flowchart illustrating the steps of managing the passage of time observed by a virtual machine according to one embodiment of the invention. The steps of FIG. 2 shall be discussed below with reference to FIGS. 1A and 1B.

In step 210 of FIG. 2, computer system 100 maintains a set of physical time sources 110. Set of physical time sources 110 may be, in whole or in part, maintained by the physical hardware of computer system 100.

In an embodiment, set of physical time sources 110 may include logical time sources (using approaches such as tick counting and tickless timekeeping for example) and wall-clock time (also referred to as absolute time). Set of time sources 110 are maintained in a continuous fashion, and so step 220 will be performed simultaneously with step 210.

In step 220 of FIG. 2, a set of virtual time sources 132 are computed and subsequently presented to a virtual machine. The set of virtual time sources 132 are adjusted to advance at a different rate than set of physical time sources 110 maintained by computer system. To provide a concrete example, the performance of step 220 will be described below with reference to hypervisor 120 adjusting set of virtual time sources 132 exposed to operating system 140.

In certain situations, the set of virtual time sources 132 may advance at a slower rate than the set of physical time sources 110. In an embodiment, the values of the set of physical time sources 110 (which may include the values of wall-clock time and CPU timing registers such as but not limited to TSC and periodic timer interrupts) may be scaled back or reduced to dynamically create the set of virtual time sources 132. The set of virtual time sources 132 may be presented or exposed to guest operating system 140 so that guest operating system 140 observes a version of time that is passing more slowly than the equivalent values in the set of physical time sources 110.

The values of the set of physical time sources 110 are adjusted to create the values of the set of virtual time sources 132 using an algorithm to make it appear to guest operating systems observing the set of virtual time sources 132 that time is passing in a natural manner, i.e., as if the guest operating system was executing on a physical machine rather than in a virtual environment. This allows all the values in the set of virtual time sources 132 to progress in a lock step manner to prevent any of the values from becoming unsynchronized with any other value in the set of virtual time sources 132.

Embodiments of the invention may adjust the values of set of virtual time sources 132 to perform time dilation to optimize the performance known operations or sequences of operations, or to facilitate problem-free completion of those operations, within virtual machine 130. Such time dilation may prevent timeouts whilst performing operations such as creating a template virtual machine using low CPU and low I/O resources. Time dilation may be used be used to perform certain resource intensive activity, such as creating a template virtual machine, in the background without impacting the user.

In other situations, in performing step 220, the set of virtual time sources 132 may advance at a rate faster than the set of physical time sources 110. For example, in an embodiment, the values of the set of physical time sources 110 (which may include the values of wall-clock time and CPU timing registers such as but not limited to TSC and periodic timer interrupts) may be scaled up or increased to dynamically create the set of virtual time sources 132. In this way, the set of virtual time sources 132 may be presented or exposed to guest operating system 140 so that guest operating system 140 observes a version of time that is passing more quickly than the equivalent values in the set of physical time sources 110.

By causing the set of virtual time sources 132 to advance at a rate faster than the set of physical time sources 110, guest operating system 140 need not wait for a certain amount of real or wall-clock time to pass before performing meaningful work which requires the passage of such real or wall-clock time. For example, using time dilation techniques of an embodiment may be used to cause delayed malware payloads to trigger more quickly than they would in normal time, thereby speeding up any detection process.

Embodiments may dynamically adjust the values in the set of virtual time sources 132 using an adaptive algorithm to maximize the meaningful work being performed by guest operating system 140. For example, assume malware detection software designed to observe the behavior of executing files for purposes of detecting malware is executing within virtual machine 130. When it is determined that the malware detection software is waiting for a certain amount of real-world time or absolute time to pass before rendering a decision on whether an executing file comprises malware, rather than waiting for that time to pass, the set of virtual time sources 132 may be sped up until the malware detection software observes the required time has passed, thereby allowing the malware detection software to render a decision in a manner that best utilizes computational resources and without requiring the passage of a certain amount of real-world time to pass.

Such adaptive algorithms employed by environments may thus speed up or slow time, as necessary, the rate at which time passes as measured by the set of virtual time sources 132. Accordingly, the adjustments may to the set of time sources 110 to compute the set of virtual time sources 132 need not be constant and can adapt dynamically to match, for example, the pace of time in guest operating system 140 to the CPU and I/O resources the host operating system is able to offer to guest operating system 140 on a second to second basis.

To prevent timeouts, embodiments of the invention may allow time sources in the set of virtual time sources 132 (including wall-clock time) to only advance when virtual machine 130 has allocated CPU and I/O resources.

Embodiments of the invention may also immediately advance time sources in the set of virtual time sources 132 (including the injection of time interrupts) as soon as virtual machine 130 becomes idle and is not waiting for I/O operations to complete. This strategy allows time, as observed by virtual machine 130, to advance as quickly as possible without causing I/O operations to time out.

While embodiments of the invention have chiefly been described above with references to concrete examples involving FIG. 1A, embodiments of the invention may be used in other virtualization environments. For example, embodiments of the invention may be implemented using the virtualization environment of FIG. 1B. In the virtualization environment of FIG. 1B, any activity described above relative to set of virtual time sources 132 will correspond to virtual time sources 152, 182, or 192, any activity described above relative to hypervisor 120 will correspond to hypervisor 170, any activity described above relative to virtual machine 130 will correspond to virtual machine container 152 or virtual machines 180 and 190, and any activity described above relative to guest operating system 140 will correspond to operating system 160 or guest operating system 184 or 194. For example, in the virtualization environment of FIG. 1B, the performance of step 220 may be performed by (1) hypervisor 170 adjusting set of virtual time sources 152 exposed to operating system 160 in virtual machine container 150, (2) hypervisor 170 adjusting set of virtual time sources 182 exposed to guest operating system 184 in virtual machine 180, and/or (3) hypervisor 170 adjusting set of virtual time sources 192 exposed to guest operating system 194 in virtual machine 190.

As depicted in FIG. 1B, different software execution environments may be exposed to different virtual time sources. For example, set of virtual time sources 182 may be operating independently from set of virtual time sources 192. As another example, set of virtual time sources 152 may be operating independently from either set of virtual time sources 182 or set of virtual time sources 192.

Embodiments of the invention may operate in a nested virtualization environment. A nested virtualization environment is an operational environment which employs one or more nested hypervisors or one or more nested containers. To illustrate one example, a first hypervisor may execute a second hypervisor as a guest, and the second hypervisor may generate virtual time sources based on the time sources presented to the second hypervisor by the first hypervisor. The time sources presented to the second hypervisor by the first hypervisor may be either physical time sources or virtual time sources themselves. Such a nested arrangement can be repeated any number of times; for example, the second hypervisor may execute a third hypervisor as a guest, and the third hypervisor may generate virtual time sources based on the physical or virtual time sources presented to the third hypervisor by the second hypervisor. This nesting can be extended ad infinitum, for example, the third hypervisor may execute a fourth hypervisor as a guest, and the fourth hypervisor may generate virtual time sources based on the physical or virtual time sources presented to the fourth hypervisor by the third hypervisor.

Hardware Mechanisms

Figure 3:
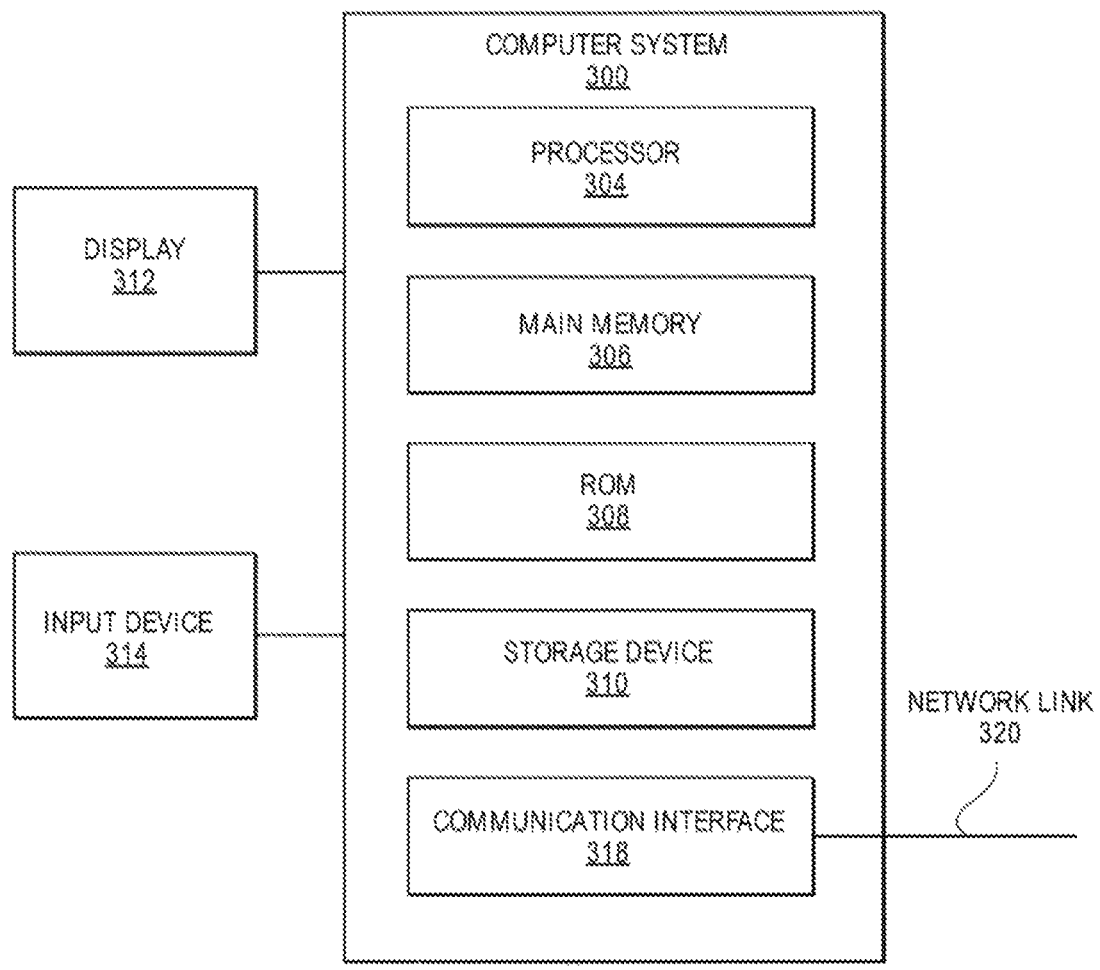
FIG. 3 is a block diagram that illustrates the hardware components of a computer system upon which an embodiment of the invention may be implemented.

FIG. 3 is a block diagram that illustrates a computer system 300 upon which an embodiment of the invention may be implemented. Computer system 300 may correspond to computer system 100 of FIG. 1A or computer system 102 of FIG. 1B. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 304 for execution. Storage device 310 may correspond to a non-transitory machine-readable storage medium. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A non-transitory machine-readable storage medium comprising instructions that when executed cause a processor to:

maintain in a computer system, a set of physical time sources, of a host operating system of the computer system, which measure logical time for the computer system and do not measure wall-clock time;

compute a set of virtual time sources based on the set of physical time sources, wherein the set of virtual time sources operate independently of the set of physical time sources, and wherein the set of virtual time sources are dynamically adjusted, by a virtualization management environment managing a software execution environment, to dynamically adjust timing values of the set of virtual time sources, relative to corresponding timing values of the physical time sources, at a faster or slower rate matching an amount of physical resource provided to the software by the host operating system; and present, by the virtualization management environment, the set of virtual time sources to the software execution environment as the set of physical time sources.

2. The non-transitory machine-readable storage medium of claim 1, wherein the instructions to compute a set of virtual time sources include instructions to advance the set of virtual time sources at a slower rate than the set of physical time sources.

3. The non-transitory machine-readable storage medium of claim 1, wherein the instructions to compute a set of virtual time sources include instructions to advance the set of virtual time sources at a faster rate than the set of physical time sources.

4. The non-transitory machine-readable storage medium of claim 1, wherein the instructions to compute a set of virtual time sources include instructions to advance the set of virtual time sources responsive to the software execution environment allocating CPU resources and I/O resources for executing the operation.

5. The non-transitory machine-readable storage medium of claim 1, wherein the instructions to compute a set of virtual time sources include instructions to dynamically adjust a rate at which the set of virtual time sources advance.

6. The non-transitory machine-readable storage medium of claim 1, wherein the instructions to compute the set of virtual time sources includes instructions to:
prevent time outs from occurring within the software execution environment by adjusting, at a fixed rate, a rate at which the set of virtual time sources advance.

7. The non-transitory machine-readable storage medium of claim 1, further including instructions that when executed cause the processor to create a virtual machine template by the software execution environment.

8. The non-transitory machine-readable storage medium of claim 1, wherein the instructions to compute the set of virtual time sources include instructions to:
dynamically adjust a rate at which the set of virtual time sources advance in proportion to an amount of the resources allocated to the software execution environment.

9. The non-transitory machine-readable storage medium of claim 1, further including instructions that when executed cause the processor to adjust the set of virtual time sources using a hypervisor.

10. The non-transitory machine-readable storage medium of claim 1, wherein the software execution environment is a virtual machine.

11. The non-transitory machine-readable storage medium of claim 1, wherein the instructions to compute the set of virtual time sources include instructions to:
dynamically advance the set of virtual time sources or increase a rate at which the set of virtual time sources advance in response to a determination that the software execution environment is idle.

12. The non-transitory machine-readable storage medium of claim 1, wherein the instructions to compute the set of virtual time sources include instructions to dynamically adjust a rate at which the set of virtual time sources advance at periodic intervals of absolute time.

13. The non-transitory machine-readable storage medium of claim 1, wherein the set of virtual time sources are a first set of virtual time sources, and further including instructions that when executed cause the processor to:
compute a second set of virtual time sources based on the set of physical time sources, wherein the second set of virtual time sources operate independently of the set of physical time sources and the first set of virtual time sources.

14. A method for managing how a passage of time is observed by a software execution environment, comprising:
maintaining a set of physical time sources, of a host operating system of a computer system, which measure logical time for the computer system and do not measure wall-clock time;
computing a set of virtual time sources based on the set of physical time sources, wherein the set of virtual time sources operate independently of the set of physical time sources, wherein the set of virtual time sources measure logical time for the computer system and do not measure wall-clock time, and wherein the set of virtual time sources are dynamically adjusted, by a virtualization management environment managing the software execution environment, to dynamically adjust timing values of the set of virtual time sources, relative to corresponding timing values of the physical time sources, at a faster or slower rate matching an amount of physical resource provided to the software by the host operating system; and
presenting, by the virtualization management environment, the set of virtual time sources to the software execution environment as the set of physical time sources.

15. A computing apparatus, comprising:
a processor; and
a non-transitory, computer-readable storage medium comprising instructions that when executed cause the processor to:
maintain a set of physical time sources, of a host operating system of the computer apparatus, which measure logical time for the computing apparatus and do not measure wall-clock time;
compute a set of virtual time sources based on the set of physical time sources, wherein the set of virtual time sources operate independently of the set of physical time sources the set of virtual time sources measure logical time for the computing apparatus and do not measure wall-clock time, and wherein the set of virtual time sources are dynamically adjusted, by a virtualization management environment managing a software execution environment, to dynamically adjust timing values of the set of virtual time sources, relative to corresponding timing values of the physical time sources, at a faster or slower rate matching an amount of physical resource provided to the software by the host operating system; and
present, by the virtualization management environment, the set of virtual time sources to a software execution environment as the set of physical time sources.

* * * * *